United States Patent
Kapitza et al.

[11] Patent Number: 5,781,338
[45] Date of Patent: Jul. 14, 1998

[54] MICROSCOPE STAGE

[75] Inventors: Hans-Georg Kapitza; Claus Lichtenberg, both of Oberkochen, Germany

[73] Assignee: Carl Zeiss Stiftung, Heidenheim, Germany

[21] Appl. No.: 579,024

[22] Filed: Nov. 17, 1995

[30] Foreign Application Priority Data

Nov. 17, 1994 [DE] Germany .................... 44 40 913.3

[51] Int. Cl.$^6$ .................... G01N 21/01; G02B 21/26
[52] U.S. Cl. .................... 359/398; 359/385; 359/391
[58] Field of Search .................... 359/368, 385, 359/391–398

[56] References Cited

U.S. PATENT DOCUMENTS

| | | | |
|---|---|---|---|
| 4,674,846 | 6/1987 | Lippman | 359/395 |
| 5,249,077 | 9/1993 | Laronga et al. | 359/385 |
| 5,566,021 | 10/1996 | Pettingell et al. | 359/391 |

FOREIGN PATENT DOCUMENTS

| | | | |
|---|---|---|---|
| 0245089 | 11/1987 | European Pat. Off. | |
| 100475 | 2/1984 | Germany | 359/391 |
| 23710 | 10/1991 | Japan | 359/599 |
| 5150168 | 11/1991 | Japan | |

*Primary Examiner*—Thong Nguyen

[57] ABSTRACT

A stage for microscopes has a transparent ceramic glass plate on the working region on its object side and a brightly colored, light-scattering layer between the ceramic glass plate and the metallic base portion of the stage. Light is coupled into end faces of the ceramic glass plate by means of lamps or a glass fiber arranged in the base portion. The stage has outstanding resistance to wear and scratches due to the ceramic glass. By the additional illumination of the ceramic glass, the specimen regions lying outside the illuminating field of the condenser are weakly illuminated against a bright background, so that the observer can select visually, without magnification, object regions of interest and then push them into the illuminating field of the condenser. The ceramic glass covers the condenser opening in the base portion of the stage, so that the condenser is protected against falling contamination. The front lens of the condenser is arranged directly on the side of the parallel-plane ceramic glass plate that is remote from the object. An enlarged illuminating aperture is thereby obtained.

10 Claims, 1 Drawing Sheet

MICROSCOPE STAGE

BACKGROUND OF THE INVENTION

1. Field of the Invention

Microscope stages are usually fitted to a microscope stand on one or two sides, and are made of light alloy. The components of the microscope arranged beneath the stage (a condenser in the case of an upright microscope, or a revolving nosepiece in the case of an inverted microscope) are accessible via at least two sides of the stage that remain free. Moreover, stages are usually lacquered black, to avoid contamination of the stages or to maintain their good appearance even if contaminated. With heavy use (e.g., in clinical routines), wear marks tend to appear on such stages in the region of the working surface. In particular, splinters of broken glass slides, often retained in residues of immersion oil, scratch the working surface when an object is shifted and erode the working surface. Furthermore, because these conventional stages are lacquered black, they do not permit pre-orientation by the observer with respect to the specimen. For such coarse pre-orientation, the observer has to take the object from the stage and hold it against a bright background.

2. Discussion of Prior Art

To prevent a worn appearance, it has been proposed to apply a ceramic coating to the working surface of the stage. In JP-A-05-150168 (Japanese Laid-Open Patent Document) for example, a thin ceramic coating is applied by a flame spraying process. However, even in stages with ceramic surfaces that are offered in the market, the ceramic surfaces are very dark in color and do not permit pre-orientation by an observer with respect to specimens present on the stages.

A microscope for routine uses, having a box-shaped lower portion, is known from European Patent Document EP-A1-0 245 089. The box-shaped lower portion contains a transmitted light source and is covered at the top by a transparent glass plate on which the objects are placed. Pre-orientation with respect to the specimen is possible by means of illumination of the glass plate. However, this system entails special construction of the lower portion of the microscope, in which the glass plate is unsupported over a relatively large surface. If the glass plate breaks, pieces of glass fall into the box-shaped lower portion and can damage the transmitted light source contained in the box-shaped lower portion. Moreover, in this case, glass fragments from broken glass slides can also leave scratches in the glass plate as the specimen is moved.

SUMMARY OF THE INVENTION

The object of the present invention is to eliminate the above-described disadvantages arising in the state of the art. A stage is to be provided in which scratching of the working surface (the surface on which specimens are placed) is largely prevented, and which permits pre-orientation by the user with respect to specimens present on the stage.

These objects are achieved by a microscope stage having a base portion, a transparent ceramic glass portion with an upper side for placing specimens thereon, at least in a partial region, and a brightly colored, light-scattering layer between the transparent ceramic glass portion and the base portion.

The stage according to the invention has a base portion. Like conventional stages, the base portion is made of metal, for example, light metal alloy. The stage has a transparent ceramic glass portion on its upper side, at least in a partial region. This transparent ceramic glass portion has a hardness greater than that of glass. Such a ceramic glass is offered, for example, by the firm of Schott Glaswerke, Mainz, Germany, under the Trademark "Zerodur." A brightly colored, for example white colored light-scattering layer, which can be produced, for example by matte white lacquering of the base portion, is located between the transparent ceramic glass portion and the base portion.

Because of the hardness of the ceramic glass portion, scratching of the upper surface is largely prevented. Moreover, the ceramic glass portion can be nearly completely supported on the base portion, so that danger of breakage of the ceramic glass portion is largely excluded. The brightly colored, light-scattering layer has the effect that, together with the ceramic glass portion, the specimen is observable in front of a brightly colored background, at least with sufficient light from the surroundings, and the observer can pre-orient the specimen.

Besides having a high hardness, the ceramic glass "Zerodur" has a negligible coefficient of thermal expansion, so that the ceramic glass can have highly accurate divisions for an incremental measuring system that measures the position of a mechanical stage.

In an advantageous embodiment, additional means are provided for illuminating the brightly colored, light-scattering layer. Light for this illumination can be coupled into the transparent ceramic glass portion at its end faces. Due to this additional illumination, a pre-orientation of or in the specimen is possible, independently of the light from the surroundings, even when working in a dark room. Light for illuminating the light-scattering layer can be derived from the transmitted light illumination of the microscope, by coupling a portion of this light out of the illuminating beam path and into the end faces of the ceramic glass portion, by means of glass fibers. Small lamps or light emitting diodes can also be arranged in recesses in the base portion of the stage for illuminating the light-scattering layer. In this case, the additional illumination can more easily be switched off.

As far as possible, the additional illumination of the light-scattering layer is set, as regards its brightness, such that the outer casing of the objective that is in the working position is also illuminated. The user can know, even in a dark room, exactly which objective is being used.

In principle, the ceramic glass portion, just like the base portion of the stage, can have a condenser bore for passage of the transmitted light illuminating beam path. However, it is particularly advantageous to construct the ceramic glass portion as a plate without a bore, covering the condenser bore in the base portion. The condenser arranged beneath the stage is thereby protected from contamination falling into it, such as, for example, fragments of the object, or liquids.

In a further advantageous embodiment, the front lens of the condenser is incorporated into a plane-parallel ceramic glass portion on its side remote from the object, or is attached to the ceramic glass portion as a glass lens. Very large apertures can be attained in this embodiment for illumination, due to the high refractive index of the ceramic glass portion.

BRIEF DESCRIPTION OF THE DRAWING

The invention is described in more detail herein below, with reference to preferred embodiments illustrated in the Figures, in which.

DETAILED DESCRIPTION OF PREFERRED EMBODIMENTS

Figure 1:
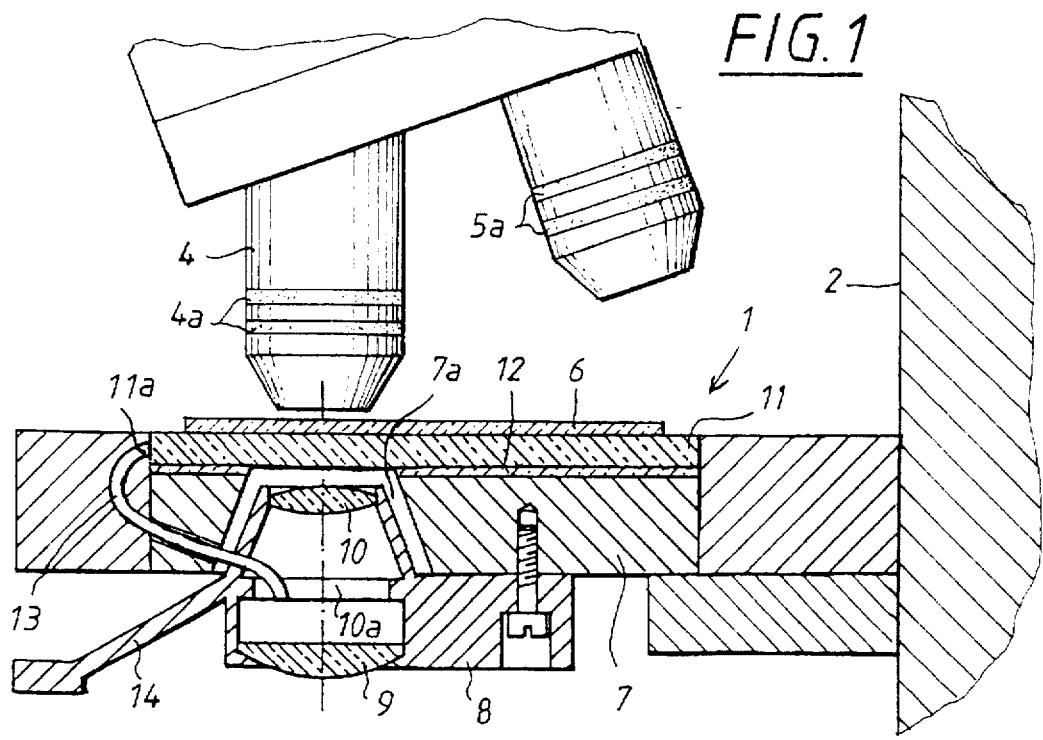
FIG. 1: shows a first preferred embodiment of a stage according to the invention, in section and with a ceramic glass plate covering the condenser bore.

The middle portion of a conventional microscope is shown in FIG. 1. The stage (1) is supported on one side on the vertical stand column (2) and is adjustable in height, for focusing. For illumination of a preparation (6) situated on the stage (1), a transmitted light condenser (8) with condenser lenses (9, 10) is arranged at the stage on the side of the stage (1) remote from the preparation (6). The front lens (10) of the condenser (8) is then positioned within a condenser bore (7a), which passes through the base portion (7) of the stage. Moreover, the diameter of the aperture iris diaphragm (10a) is variable by means of an adjusting lever (14).

The base (7) of the stage (1) is provided on the object side with a recess, in which a plane-parallel ceramic glass plate portion (11) is inserted. The ceramic glass plate portion (11) is transparent for visible light and has greater hardness than glass. A suitable material for the plane-parallel plate portion (11) is, for example, the ceramic glass composition offered by the firm of Schott Glaswerke, Mainz, Germany, under the trademark, "Zerodur".

A brightly colored, light-scattering surface (12) is provided between the ceramic glass plate portion (11) and the base portion (7) of the stage (1). This brightly colored, light-scattering surface (12) is easily produced as a matte white lacquer surface on the base portion (7).

For illuminating the preparation (6) as uniformly as possible, even in regions outside the illuminating field defined by the condenser (8), glass fibers (13) are provided, through which a portion of the illuminating light is conducted and coupled into the end faces (11a) of the ceramic glass plate (11). The light that is coupled in is diffusely reflected at the brightly colored, light-scattering layer (12), and emerges from the ceramic glass plate portion (11) on the object side. The specimen consequently lies on a bright, luminescent surface. Regions adjacent to the illuminating field of the condenser (8) are therefore weakly illuminated. The user can thus easily pre-select the regions of the specimen (6) that are of interest to the user, and bring the regions into the visual field of the microscope.

The illumination of the plane-parallel, transparent ceramic glass plate (11) is selected, as regards its brightness, such that even in a completely darkened room the colored coding rings (4a, 5a) can be recognized, at least of the (4) objective that is in the beam path. Thus, by means of the illumination of the stage (1), the observer can tell which objective is in use, even in microscopes without a separate display that indicates which objective is inserted into the beam path.

In the preferred emdodiment according to FIG. 1, the ceramic glass plate (11) does not have a condenser bore and covers the condenser bore (7a) of the base portion (7). The condenser (8) with its optical components (9, 10) is thereby protected from contamination falling onto it, such as, for example, fragments of glass slides (6) or liquids. If the ceramic glass plate (11), because of its spectral transmission characteristics, causes undesirable alteration of the color of the illuminating light, color filters can be arranged in the illuminating beam path, if necessary, to compensate for such alteration of the color.

Figure 2:
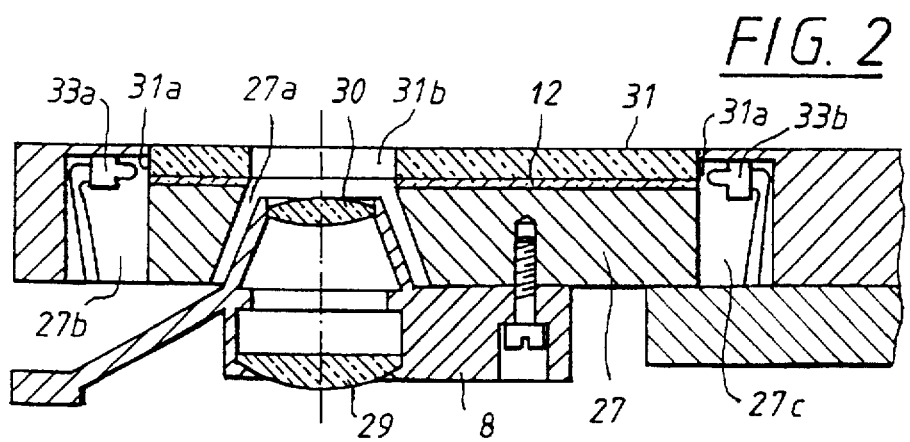
FIG. 2: shows a second preferred embodiment of a stage according to the invention, in section.

In the preferred embodiment according to FIG. 2, protection of the condenser optics (29, 30) is dispensed with. The plane-parallel ceramic glass plate (31) has a condenser bore (31b) that is coaxial with the condenser bore (27a) of the base portion (27). Moreover, light emitting diodes (33a, 33b) are provided for illumination instead of a glass fiber (13). These light emitting diodes (33a, 33b) are arranged in recesses (27b, 27c) in the base portion (27) of the stage, so that a portion of the light emitted by the light emitting diodes (33a, 33b) is coupled into the ceramic glass plate (31) at the end faces (31a). The use of light-emitting diodes or other separate light sources in the base portion of the stage provides the advantage that the additional illumination of the ceramic glass portion can be switched off in a simple manner by a switch when such illumination is found to be disadvantageous for microscopy. The latter is frequently the case in fluorescence applications of the microscope.

The stage of FIG. 2 can be used, with slight modifications, in inverted microscopes. For this purpose, it is only necessary to make the condenser bore sufficiently large so that the objectives received in a revolving nosepiece can be pivoted into the working position, and thus over the bore.

Figure 3:
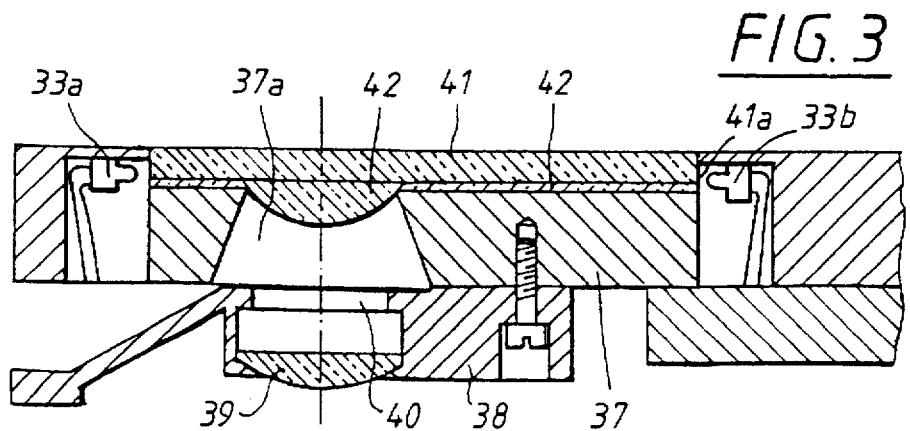
FIG. 3: shows a third preferred embodiment of a stage according to the invention, in section, in which the front lens of the condenser is arranged on the ceramic glass portion.

The preferred embodiment of FIG. 3 corresponds to the embodiment according to FIG. 2 as regards illumination of the plane-parallel ceramic glass plate (41). The plane-parallel plate (41) is constructed without a condenser opening, so that the condenser arranged beneath the stage is protected against falling contamination. Moreover, in this embodiment, the front lens (42) for the condenser is arranged directly on the plane-parallel plate (41) on its side remote from the object, in the condenser opening (37a) of the base portion (37). The condenser portion (38) is screwed directly to the base portion (37) of the stage, and consequently includes only the rear lens (39) and the aperture diaphragm (40). Only the ceramic glass plate (41), with its high refractive index in comparison to air, is located between a slide supported on the ceramic glass portion (41) and the front optics (42) of the condenser. As a result, this embodiment leads to a higher illuminating aperture than in the previously described embodiments, with comparable optical data for the condenser lenses (39, 42).

In contrast to the stage of European Patent Document EP-A1-0 245 089 mentioned above, the stage according to the invention requires no special construction of the lower portion of the microscope. It can therefore be retrofitted to existing microscopes by changing out the prior stage.

We claim:

1. A microscope stage comprising:

a base portion, a transparent ceramic glass portion having an upper side for placing specimens at least in a partial region on said upper side, and a brightly colored, light-scattering layer between said transparent ceramic glass portion and said base portion.

2. A microscope stage according to claim 1, further comprising illumination means for illumination of said brightly colored, light-scattering layer.

3. A microscope stage according to claim 2, wherein said transparent ceramic glass portion has end-faces, and said illumination means comprises light-coupling means for coupling light into said transparent ceramic glass portion at said end-faces.

4. A microscope stage according to claim 3, wherein said light-coupling means comprises glass fibers for coupling light from a transmitted light illumnation into said transparent ceramic glass portion.

5. A microscope stage according to claim 3, wherein said light-coupling means comprises light-emitting diodes.

6. A microscope stage according to claim 5, wherein said base portion has recesses therein and said light-emitting diodes are arranged in said recesses.

7. A microscope stage according to claim 1, wherein said base portion has a recess or depression therein and said transparent ceramic glass portion comprises a plane-parallel plate inserted in said recess or depression.

8. A microscope stage according to claim 7, wherein said base portion has a condenser bore with an end facing towards said specimen, and said transparent ceramic glass portion is arranged to cover said condenser bore on said specimen facing end of said condenser bore.

9. A microscope stage according to claim 8, wherein said plane-parallel plate has a side remote from said specimen and a lens on said remote side.

10. A microscope stage according to claim 1, having a plurality of sides, in combination with a microscope with a microscope stand, wherein said microscope stage is arranged to be received on said mictoscope stand on at least one of said sides.

* * * * *